March 8, 1955 H. CHRYSTIE 2,703,853

FOLDING TERMINAL BOARD FOR CIRCUIT COMPONENTS

Filed Jan. 18, 1952 3 Sheets-Sheet 1

INVENTOR
HENRY CHRYSTIE,
BY Nicholas T Volk
ATTORNEY.

FOLDING TERMINAL BOARD FOR CIRCUIT COMPONENTS

Filed Jan. 18, 1952 3 Sheets-Sheet 2

INVENTOR.
HENRY CHRYSTIE,
BY Nicholas T. Volsk
ATTORNEY.

March 8, 1955 H. CHRYSTIE 2,703,853

FOLDING TERMINAL BOARD FOR CIRCUIT COMPONENTS

Filed Jan. 18, 1952 3 Sheets-Sheet 3

INVENTOR.
HENRY CHRYSTIE,
BY Nicholas T. Volsk
ATTORNEY.

2,703,853

United States Patent Office

Patented Mar. 8, 1955

2,703,853

FOLDING TERMINAL BOARD FOR CIRCUIT COMPONENTS

Henry Chrystie, Northridge, Calif., assignor, by mesne assignments, to Hughes Aircraft Company, a corporation of Delaware Application January 18, 1952, Serial No. 267,175

8 Claims. (Cl. 317—101)

This invention relates to unitized electric circuits, and more particularly to devices for containing circuit components in convenient, folded, unitary form which is especially adaptable for use in electronic equipment.

Electric circuits embodied in electronic apparatus consist of numerous circuit elements mounted in a framework or chassis and electrically interconnected to produce a desired effect. The interconnections usually result in a maze of crossed wires and elements which makes the apparatus inconvenient to assemble and difficult to test and repair. An increase in circuit complexity further complicates the maze, and adds to the difficulties of assembly and service.

By dividing a composite circuit into sections, and arranging each section into a subassembled unit, the most complex electronic apparatus can be quickly and easily combined in a chassis. Thereafter, each unit can be removed, separately tested, and replaced, if necessary, with optimun efficiency. In this manner, it is possible to locate and replace defective circuit components during urgent situations in a minimum length of time, and without moving the apparatus from its place of installation. Defective units, after they are removed, can be repaired under more favorable circumstances.

As a solution of the general problem, some of the devices in current usage group circuit elements about a central post with provisions for locating a vacuum tube at either end of the post. While such a structure is unitary and can be removed from a chassis, it has certain disadvantages, for example, the need for extreme care in manipulating the central post during the attachment of circuit elements, and the need for careful handling of the assembled unit with its attached elements openly exposed.

This invention supports combined circuit elements or components as a unitized assembly usable by itself in a simple electrical apparatus, or as a section of a more complex apparatus. Its construction permits installation and repair of circuit elements or components with maximum ease and efficiency, yet it provides ample protection by enclosing the elements within its own unitary structure.

Accordingly, it is a principal object of this invention to provide a cubical structure having an inner surface for combining circuit elements thereon which structure is unfoldable to facilitate access to such circuit elements.

It is an object of this invention to provide a dielectric electronic circuit support suitable for rolling upon itself to form a cylindrical structure, which includes flexible insulation between the convolutions of the dielectric support.

It is another object of this invention to provide a compact plug-in unit for protectively supporting electric circuit components in an organized group suitably arranged for installation in electronic apparatus.

It is also an object to provide a foldable electronic circuit component support whereby a major network can be divided into minor sectional units for easy fabrication, testing, and replacement.

It is another object to provide a mounting for supporting electrical circuit components in assembled relationship with appropriate electrical junctions, which mounting forms a unitary circuit infoldment that can be easily connected to and disconnected from a major network of an electrical apparatus.

It is an additional object of this invention to provide an electric circuit support which includes an unfoldable terminal board of dielectric material to which circuit elements can be easily affixed, and a base for removably attaching the folded terminal board and properly connecting its circuit in a chassis.

It is also an object to provide a terminal board of the above character which is normally flat to permit the easy attachment of circuit elements thereto.

It is a further object to provide such a terminal board which can be rolled or folded into a hollow boxlike structure to thereby surround the elements attached thereto.

It is another object to provide a terminal board having the above characteristics which also includes means whereby each circuit component attached thereto can be individually tested.

It is also an object to provide a flexible dielectric terminal board, suitable for folding, which includes a metallic surface adaptable for shielding enclosed circuitry.

It is an additional object of this invention to provide a unitary circuit support which includes a plurality of dielectric terminal boards suitably hinged together for folding so as to encompass circuit components attached to the boards, and to also provide such boards which include a metallic surface suitable for shielding.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figures 1, 2, 3, 11:
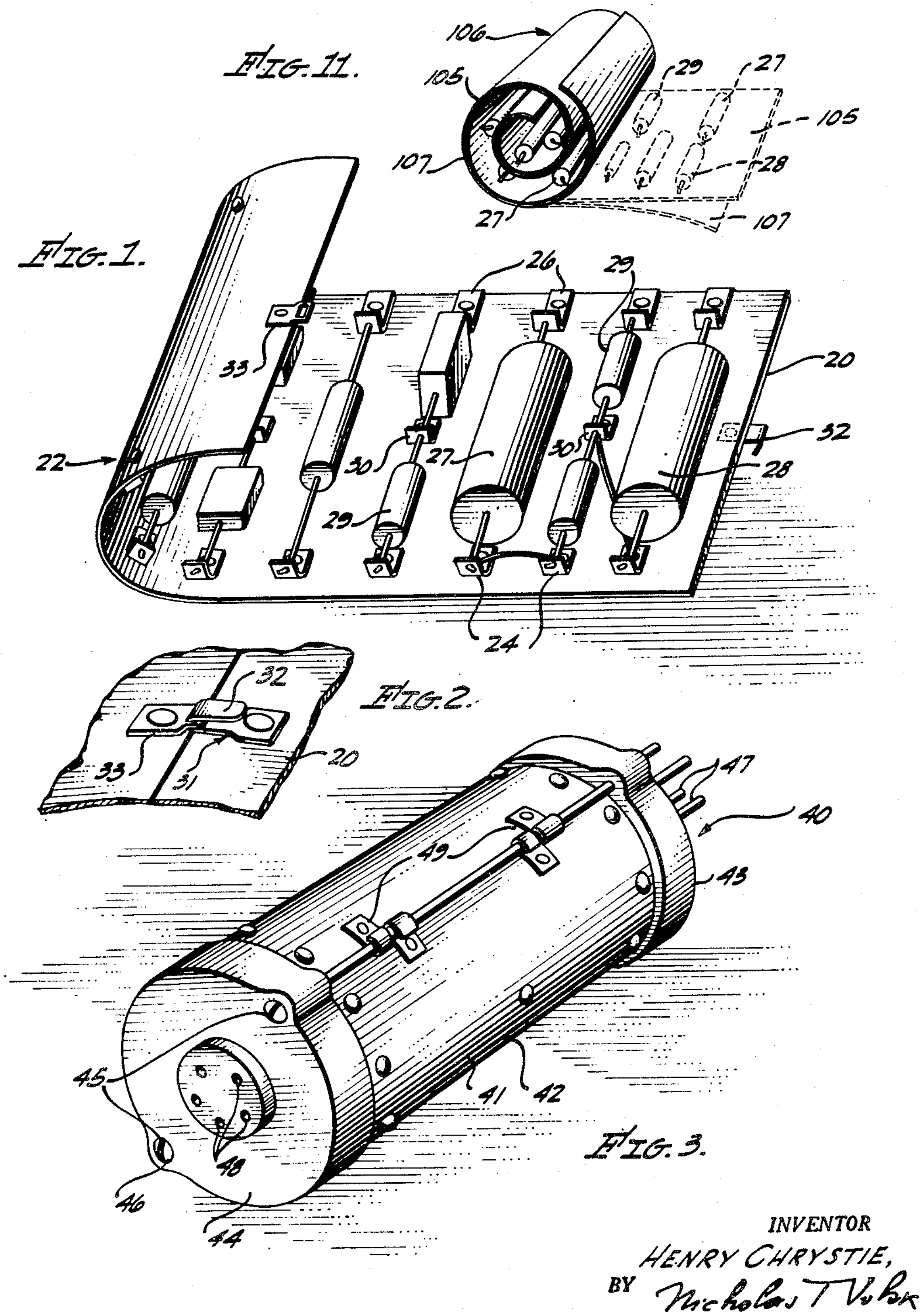
Fig. 1 is a perspective view of a partly folded terminal board having electrical circuit elements attached thereto.
Fig. 2 is an enlarged perspective view of the clasp used in Fig. 1.
Fig. 3 is a perspective view showing a cylindrical unitary support having plug-in connectors on each end.
Fig. 11 illustrates a perspective view of a flexible circuit support wound in convolutions.

As illustrated in Fig. 1, the invention includes a normally flat terminal board 20 of suitable dielectric material having sufficient flexibility to permit bending or folding as indicated by the curved portion 22. Spaced along opposite edges, terminal lugs 24 and 26 are attached, preferably by riveting, to one surface of board 20 to permit circuit components such as 27 and 28 to be assembled on the board by soldering their lead-in wires to appropriate lugs. For accommodating smaller components such as those indicated by reference character 29, lugs 30 are selectively positioned on the one surface of board 20 between lugs 24 and 26. Thus, with board 20 in its normally flat condition, a variety of circuit components can be easily mounted thereon, and they may be electrically interconnected to form a unitized circuit if desired.

After the components have been installed, terminal board 20 can then be formed into a tubular shaped hollow body with the ends of the board held in abutment, as shown in Fig. 2, by a clasp 31 comprising a bendable hook 32 and an eye 33 fastened each to an end of board 20. In this manner, a unitary circuit component holder is formed of a chosen number of components. The open ends of the tubular shaped body allowing lead-in connections to be made to proper terminal lugs whereby the enclosed components may be used by themselves or as a section of a complex circuit network. Test points for electrically checking the components protectively embraced by board 20 are automatically provided by the use of metal rivets or eyelets for attaching lugs 24, 26 and 30 to the board.

A compact plug-in unit protectively supporting an organized group of circuit components is illustrated in Fig. 3, and is indicated generally by reference numeral 40. Unit 40 is comprised of a terminal board 41 having the general characteristics of board 20, Fig. 1, including selected circuit components similarly attached and electrically connected. As shown, board 41 is bent to form a cylinder 42 which is clamped between caps 43 and 44 by screws 45 and 46. In addition to closing the open ends of cylinder 42, caps 43 and 44, preferably constructed of dielectric material, include contact prongs 47 and contact prong receptacles 48, respectively. The prongs and receptacles are electrically connected to spring contact members secured in their respective caps for the purpose of making electrical connections between the circuitry contained within unit 40 and outside electrical devices, circuits or other circuit components. Terminal lugs selectively positioned adjacent opposite edges of board 41 provide electrical connectors at the open ends of cylinder 42 for the spring contact members.

The lugs and spring contacts are of the type shown in Fig. 4, and will be fully described in connection with that figure.

In Fig. 2 the ends of board 20 are placed in abutment and then held in that position by clasp 32, whereas in Fig. 3, the butt joint of the ends of board 41 is maintained by the shank of screw 45 passing through the eye of members 49 riveted on the outside of the board adjacent the abutting ends in proper relationship to each other. Removal of screw 45 and caps 43 and 44 will allow board 41 to be unfolded from its cylindrical shape to facilitate installation as well as removal of circuit components. Where necessary, unit 40 can be hermetically sealed with a suitable wax or other moisture resistant coating.

Figures 4, 5, 6:
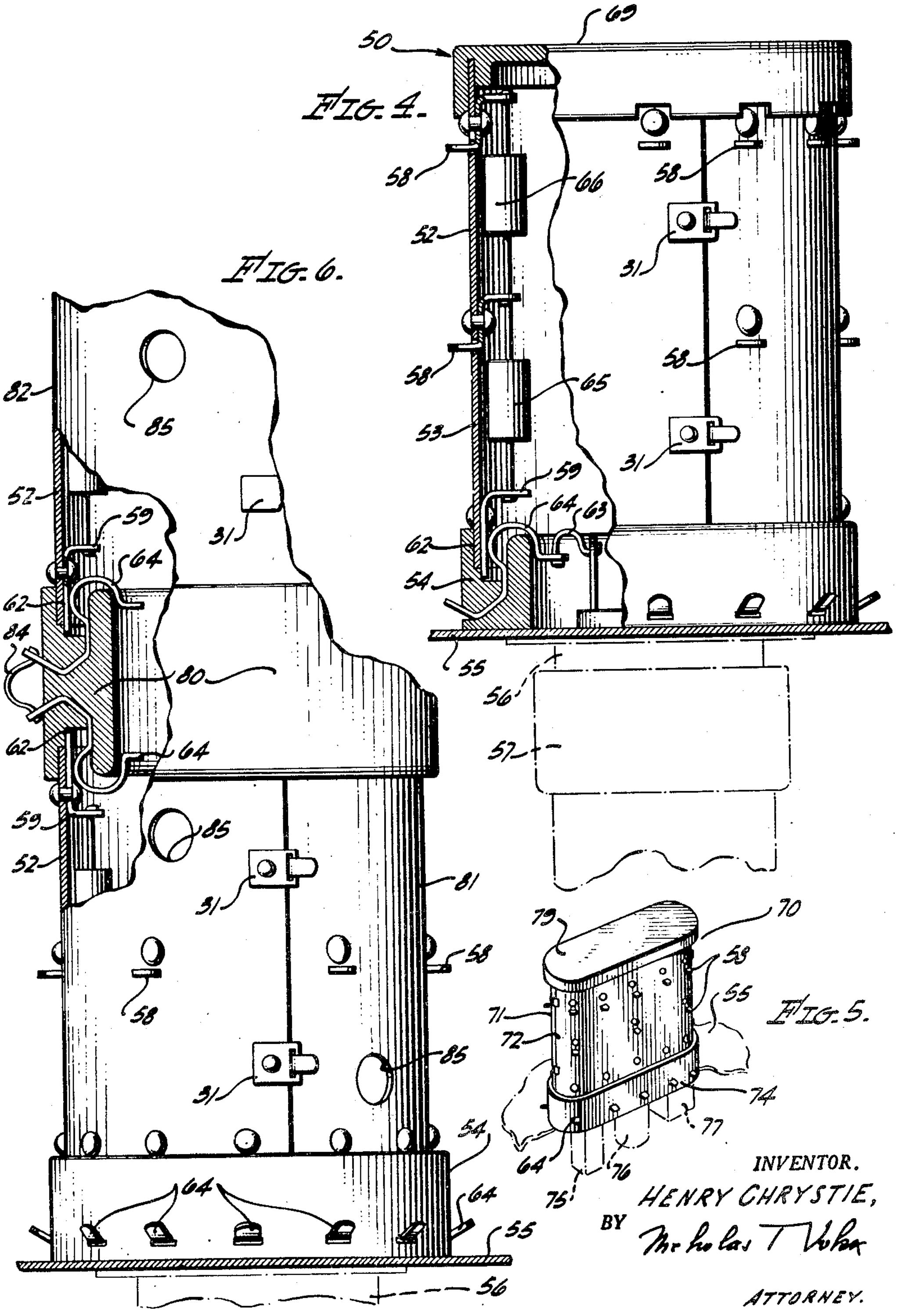
Fig. 4 is a view partly in section and partly in elevation illustrating a circuit component support attached to a chassis.
Fig. 5 is a modified form of the support shown in Fig. 4.
Fig. 6 illustrates an adapter for interconnecting two such supports as shown in Fig. 4.

The unitary circuit support 50 illustrated in Fig. 4 is particularly adaptable for attachment to the chassis of electronic apparatus. Circuit support 50 includes a normally flat terminal board 52 which is rolled into a cylinder 53 and removably attached to a base 54 securely mounted on a chassis or frame 55 (partly shown). Also secured to chassis 55 underneath but substantially concentric with base 54, is a prong type receptacle 56 for making electrical connections to a circuit component 57; for example, a vacuum tube, relay, transformer, etc.

A desired number of terminal lugs such as 58 and 59 are located systematically and riveted to one surface of board 52 when the board is in its normally flat condition. Circuit components are connected to the lugs, and then board 52 is shaped to form cylinder 53 in a manner previously described in connection with boards 20 and 41.

It is to be noted that lugs 58 include an ear which projects through an aperture in board 52 for the dual purpose of alignment and to provide a test point independent of the rivet. In this respect lugs 58 are different than lugs 24 and 30 shown in Fig. 1. Lugs 26 and 59, however, are very similar since they are used for identical purposes in units 40, Fig. 3, and 50, Fig. 4.

Lug 59 is angular in shape with a short leg of the angle perforated or notched for soldering while the other leg, perforated for riveting to terminal board 52, is sufficiently long to extend from under the rivet head to or past the edge of the board as shown in Fig. 4.

Base 54, annular in shape, is provided with an annular groove 62 in one face thereof. The outer periphery of groove 62 is complementary in size and of sufficient depth to receive the end of cylinder 53 with its group of attached lugs 59. Embedded in the body of base 54 and circumferentially located for alignment with lugs 59 is an appropriate number of spring contact members 64 which press against the lugs to form an electrical connection. As illustrated in Fig. 4, member 64 is in contact, under spring pressure with lug 59, and provides a plug-in type electrical connection between components 65, 66 of unit 50 and a solder lug 68 of prong receptacle 56, since solder lug 68 is electrically connected to the free end of spring contact member 64 by a flexible lead 63.

To protect the components contained within the cylinder 53, circuit support 50 also includes a cap 69 fitted over the top end of the cylinder.

The plug-in connection between circuit support 50 and base 53 described above is similar to, and representative of the removable connections between caps 43, 44 and cylinder 42 of Fig. 3. In other words, lug 58 is typical of the lugs used on the edges of terminal board 41, which edges form the end of cylinder 42; also, spring contact member 64 is typical of the spring contact members used in caps 43 and 44. One end of the spring contact members 64 may be exposed on the outer periphery of base 54, as illustrated in Fig. 4, or the ends may be concealed in the base or caps as indicated in Fig. 3, where they are purposely omitted from the outer periphery of caps 43 and 44.

A unitized circuit support indicated generally by numeral 70, Fig. 5, illustrates a modification in form of support 50 shown in Fig. 4. Although the illustration is of smaller scale, unit 70 can be, in actual practice, made sufficiently large to embrace additional circuit components underneath the chassis 55. Base 74 is made larger to accommodate three receptacles (not shown), to receive the three components 75, 76, and 77. Terminal boards 71 and 72 are similar to board 52 in regard to their inclusion of selectively positioned terminal lugs 58 and 59 to which selected circuit components can be electrically connected. Each board is folded to form half of a hollow tubular body suitably shaped to fit base 74 and align lugs 59 with spring contact members 64 in the base. A cap 79 closes the other end of the hollow body, thereby affording protection to components within the cubical inclosure of unit 70. Terminal boards 71 and 72 are held together by clasp 31, Fig. 2; one set of which may be opened allowing the boards to hinge on the other set.

Any number of preformed terminal boards of this character can be combined as long as their shapes are complementary to form the desired hollow body. The boards may be hinged at their adjoining edges by any one of the methods disclosed in the drawings, or simple hinges with loose pins may be used. Thus, when a hollow body is removed from its base, the boards such as 71 and 72 can be unfolded to facilitate access to the circuit components in addition to the ease of their original installation.

Fig. 6 illustrates an adapter 80 for electrically and mechanically interconnecting two separate circuit supports such as support 50 of Fig. 4. Adapter 80 having an annular shape similar to base 54 is, in effect, a unification of two such bases, because it includes the same groove 62 in each of its opposing faces for engagement with lower cylinder 81 and upper cylinder 82, both cylinders being formed of separate terminal boards 52 previously described. It is to be noted that terminal lugs 59, however, have replaced lugs 58 on the edge of the board forming the upper rim of cylinder 81, to thereby provide both cylinders 81 and 82 with lugs 59 for engagement with spring contact members 64 embedded in both sides of adapter 80, as shown. The resulting plug-in connection between the adapter and the two cylinders has been previously described in connection with Fig. 4. It is to be further noted that the exposed ends of contact members 64 extending through the outer peripheral surface of adapter 80 may be electrically connected by a lead wire 84.

Although terminal boards 52 comprising cylinders 81 and 82 are the same as terminal board 52 in Fig. 4, holes 85 have been provided therein to improve the dissipation of heat generated within the cylinders by inclosed circuit components. By using adapter 80, several unitized circuits can be easily and effectively coupled together in combination with other components connectable through socket 56.

Figure 7:
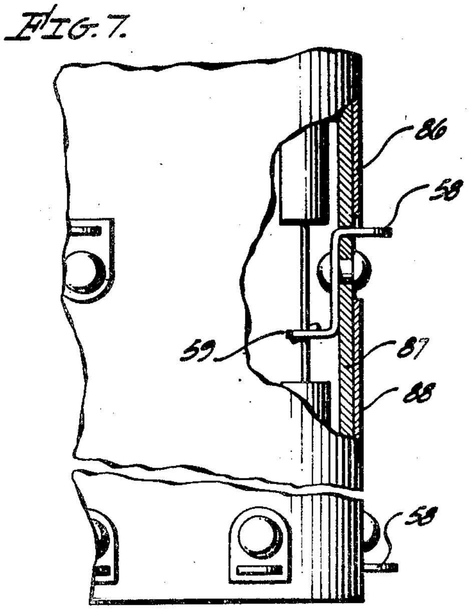
Fig. 7 is a fragmentary view of a shielded unitary support.

Fig. 7 illustrates a laminated terminal board 86 having an inner layer 87 of dielectric material and an outer layer 88 of metallic material for use in constructing the previously described circuit component supports when it is desirable to shield the circuit components inclosed within such supports.

Figure 8:
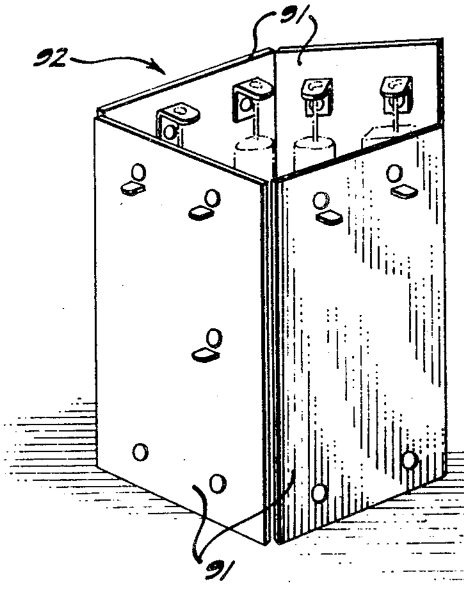
Figs. 8 and 9 illustrate a modified unitary component support having a four-section terminal board.
Figures 9, 10:
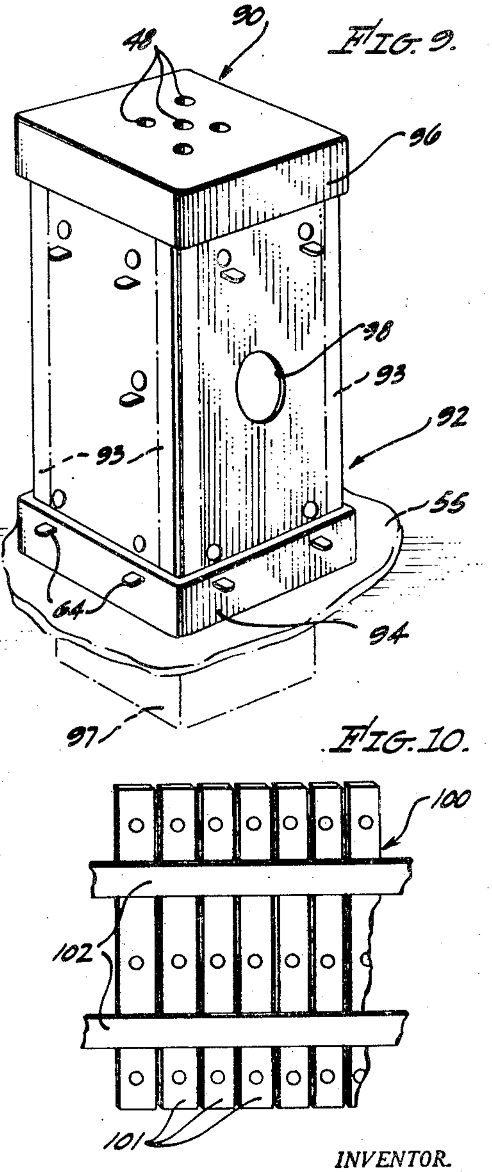
Fig. 10 illustrates a multiple strip terminal board.

Figs. 8 and 9 illustrate a modification of the invention in which a hollow box-like structure indicated generally by reference numeral 92 is comprised of four separate terminal boards 91 or side members angularly disposed with respect to each other. The boards may be hinged together if desired by any suitable means, for example, tapes 93 adhesively attached as indicated by dash lines in Fig. 9. Terminal lugs, similar to lugs 58 and 59, are riveted to each board for the attachment thereto of selected circuit components. When completely assembled, each terminal board 91, with its attached components, is held by an end member or base 94 as a side member of cubical mounting 90, Fig. 9. The electrical connections between terminal boards 91 and base 94 are accomplished in a manner similar to the electrical connections between terminal board 52 and base 54, Fig. 4, that is lugs 59 being riveted to boards 91 are in frictional contact with spring contact members 64 which are embedded in base 94. A second end member or cap 96 fitted to the side members 91 protectively covers the enclosed circuit components and completes the unitary cubical support 90 ready for attachment to a chassis 55 (partly shown). As illustrated, cap 96 includes prong receptacles 48 whereby circuit components external of mounting 90 can be electrically connected to circuit components contained within mounting 90. By removing the cap, any one or all of the side members 91 can be separated from base 94 to facilitate repair or replacement of the inclosed circuitry. A socket similar to socket 56 may be fastened to chassis 55 for electrically connecting an external circuit component 97 to terminal lugs within the cubical structure as previously described for component 57, Fig. 4. An aperture 98 may be provided in any one of the four separate boards 91 for adapting unit 90 to contain a photocell.

Fig. 10 illustrates a modified terminal board structure 100 in which narrow dielectric strips 101 are arranged in hinged relation to each other by adequate means such as tapes 102 which may be adhesively attached to extend transversely of the strips. By using terminal boards of this character, ventilation is automatically provided by the space between adjacent strips 101. Furthermore, the flexible nature of the multihinge structure makes this terminal board particularly adaptable to unitary supports of irregular shape, which supports may or may not include end closures.

In Fig. 11 is illustrated a mounting for circuit components such as 27, 28 and 29 described in Fig. 1 upon a flexible dielectric board 105. The flexible board is then rolled upon itself in convolutions to form a cylindrical structure 106 as shown. A suitable flexible insulator 107 is provided to be rolled along with the flexible board 105 to provide a layer of insulation enclosed between each convolution of board 105. In this way such circuit components as 27, 28 and 29 which are attached to one convolution of board 105 are suitably insulated from those components attached to contiguous convolutions of the dielectric board. In this way a compact electronic circuit support is provided with a chosen number of components thereon; adequately insulated to avoid undesirable circuit connections.

The various unitary supports herein described can be manufactured from a wide variety of materials, a feature which, in addition to the simplicity and convenience of assembly reduces considerably the cost of production. Such supports are particularly adaptable to electronic circuitry by allowing the division of complex networks into small sections thereby permitting a high degree of standardization in the production of those small sections.

What is claimed as new is:

1. A unitary support for a group of electric circuit elements, said support comprising: a terminal board having first and second surfaces, and first and second opposite edges, said terminal board being adapted for folding to form an open ended enclosure having the first and second edges of said board arranged adjacent each other so that the first and second surfaces of said board constitute inner and outer surfaces of said enclosure; fastening means fixed to the first and second edges of said terminal board for maintaining said first and second edges in said adjacent relationship; metallic lugs fixedly mounted in spaced and insulated relationship with respect to each other on the first surface of said terminal board to provide combination mechanical supports and electrical connections on the inner surface of the enclosure for the circuit elements of the group when said board is folded to form said enclosure; first means adapted to slidingly receive one of the open ends of the enclosure formed by said terminal board; second means for connecting selected circuit elements of the group to other circuit elements positioned external of the enclosure, said second means including first contacts connected to said selected circuit elements and fixedly associated with said one of the open ends of said enclosure, and second contacts fixed in said first means and having terminals for connection to the external circuit elements, said second contacts being slidingly engaged with said first contacts when said one of the open ends of said enclosure is received by said first means; and test terminals connected to said metallic lugs and extending through said terminal board for providing electrical connections on the outer surface of the enclosure to circuit elements supported on the inner surface of said enclosure connected to said lugs for permitting said circuit elements to be tested without unfastening said fastening means and unfolding said board when said board is folded to form said enclosure.

2. The support for a group of electric circuit elements defined in claim 1 in which said terminal board comprises a sheet of flexible dielectric material.

3. The support for a group of electric circuit elements defined in claim 1 in which said terminal board comprises a plurality of segments hingedly interconnected to provide foldability to said board.

4. The support for a group of electric circuit elements defined in claim 1 in which said terminal board includes a metallic layer forming one of the surfaces of said board, said metallic layer operating as a shield for enclosed circuit elements mounted on the inner surface of the enclosure when said board is folded to form said enclosure.

5. A unitary support for a group of electric circuit elements, said support comprising: a terminal board having first and second surfaces, first and second opposite ends, and a pair of opposite sides, said terminal board being adapted for folding to form an enclosure having a pair of open ends and having the first and second ends of said board arranged in abutting relationship so that the first and second surfaces of said board respectively constitute inner and outer surfaces of said enclosure with the pair of opposite sides comprising the pair of open ends of said enclosure; fastening means fixed to the first and second ends of said terminal board for maintaining said ends in said abutting relationship; a plurality of terminal lugs fixedly mounted in spaced and insulated relationship with respect to each other on the first surface of said terminal board to provide combination mechanical supports and electrical connections on the inner surface of the enclosure for the circuit elements of the group when said board is folded to form said enclosure, said plurality of terminal lugs including a selected number of said lugs positioned adjacent one of the pair of sides of said board, each of said selected number of lugs having a sliding-contact portion associated with one of the pair of open ends of said enclosure; first means adapted to slidingly receive said one open end of the enclosure; second means for connecting selected circuit elements of the group to other circuit elements external of said enclosure, said second means including contact members fixedly mounted in said first means with terminals for the external circuit elements, and slidingly engaged with the sliding-contact portions, of the selected terminal lugs, associated with said one open end of the enclosure when said one open end in slidingly received by said first means; and test terminals connected to said metallic lugs and extending through said terminal board for providing electrical connections, on the outer surface of the enclosure, for circuit elements supported on the inner surface of said enclosure and connected to said plurality of terminal lugs for permitting said circuit elements to be tested without unfastening said fastening means and unfolding said board when said board is folded to form said enclosure.

6. Apparatus for mechanically supporting and electrically interconnecting a plurality of individual groups of electric circuit elements, said apparatus including a plurality of individual enclosures for the individual groups of circuit elements, having first and second open ends, and inner and outer surfaces, each of said individual enclosures comprising: a terminal board having first and second surfaces, first and second opposite sides, and first and second opposite ends, said terminal board being adapted for folding to permit arrangement of said first and second ends in substantially abutting relationship for forming said enclosure with its inner and outer surfaces and its first and second open ends respectively formed of the first and second surfaces and the first and second sides of said terminal board; fastening means fixed to the first and second ends of said terminal board for maintaining said ends in abutting relationship; first and second terminal lugs fixedly mounted in spaced and insulated relationship, with respect to each other, on the first surface adjacent the first and second sides, respectively, of said terminal board to provide combination mechanical supports and electrical connections on the inner surface of said enclosure for elements of an individual group of circuit elements when said board is folded to form said enclosure, a selected number of said first and second terminal lugs being respectively provided with first and second sliding-contact portions, which portions are respectively associated with the first and second open ends of said enclosure; a first member adapted to slidingly receive the first open end of said enclosure; first contact elements fixed in said first member with externally accessible terminals, said first contact elements being slidingly engaged with said first sliding-contact portions when the first open end of said enclosure is slidingly received by said first member for connecting selected circuit elements in said enclosure to other circuit elements external of said enclosure; and test terminals connected to said first and second terminal lugs and extending through said terminal board for providing, on the outer surface of said enclosure, electrical connections to the circuit elements supported on the inner surface of said enclosure and connected to said first and second lugs for permitting said circuit elements to be tested without unfastening said fastening means and unfolding said board when said board is folded to form said enclosure.

7. The combination defined in claim 6 in which said apparatus further includes means for mechanically connecting two of said enclosures and electrically interconnecting selected circuit elements of each group of circuit elements individually supported within each of said two enclosures, said means comprising: a second member adapted to slidingly receive the first open end of one of said enclosures and the second open end of another of said enclosures; and second contact elements fixed in said second member and slidingly engageable with said first and second sliding-contact portions for interconnecting selected circuit elements in said two enclosures when said second member slidingly receives the open ends of said two enclosures.

8. The combination defined in claim 7 in which said terminal board comprises a plurality of segments hingedly interconnected to provide foldability to said board for forming said enclosure.

References Cited in the file of this patent

UNITED STATES PATENTS

| | | |
|---|---|---|
| 1,611,215 | McArthur | Dec. 21, 1926 |
| 1,719,284 | Barnes | July 2, 1929 |
| 2,070,112 | Bowles | Feb. 9, 1937 |
| 2,307,561 | Bailey | Jan. 5, 1943 |
| 2,444,037 | Fritschi | June 29, 1948 |
| 2,466,192 | Wood | Apr. 5, 1949 |
| 2,553,255 | Hayward | May 15, 1951 |

FOREIGN PATENTS

| | | |
|---|---|---|
| 635,947 | Great Britain | Apr. 19, 1950 |
| 671,156 | France | Dec. 10, 1929 |